United States Patent
Nada et al.

[11] Patent Number: 6,094,477
[45] Date of Patent: Jul. 25, 2000

[54] ELECTRONIC MAIL TERMINAL AND SYSTEM FOR AUTOMATICALLY DOWNLOADING ELECTRONIC MAIL

[75] Inventors: Noriaki Nada, Chikushino; Yasuyuki Nishioka, Dazaifu, both of Japan

[73] Assignee: Matsushita Electric Industrial Co., Ltd., Osaka, Japan

[21] Appl. No.: 08/996,883

[22] Filed: Dec. 23, 1997

[30] Foreign Application Priority Data

Jan. 9, 1997 [JP] Japan .................................. 9-002058
Sep. 9, 1997 [JP] Japan .................................. 9-243804

[51] Int. Cl.[7] .................................................. H04M 11/00
[52] U.S. Cl. .................... 379/93.24; 379/142; 379/93.23
[58] Field of Search .............................. 379/93.01–93.08, 379/93.17, 93.23–93.26, 100.08, 100.14, 88.12, 142, 88.17, 88.21

[56] References Cited

U.S. PATENT DOCUMENTS 5,850,519  12/1998  Vazana ..................................... 379/142

FOREIGN PATENT DOCUMENTS 0 736 989  10/1996  European Pat. Off. .

*Primary Examiner*—Wing F. Chan
*Attorney, Agent, or Firm*—Venable; Robert J. Frank; Allen Wood

[57] ABSTRACT

A system for delivering electronic mail through the internet includes a CPU, a ROM for storing a program for controlling the system, a RAM for storing data and a caller telephone number, a display unit for interfacing with a display unit, an input unit for interfacing with an input device, a modem unit for converting analog data to be used by a telephone into digital data to be processed by a computer, and a network control unit for interfacing with a network, the network control unit also being capable of recognizing caller telephone numbers. The delivering system enables of the electronic mail through the use of the caller ID.

12 Claims, 15 Drawing Sheets

FIG.8

ELECTRONIC MAIL MANAGEMENT TABLE
20        21        22              23

| ELECTRONIC MAIL ID | ACCESS | MAIL DATA POINTER |
|---|---|---|
| 01-000001 | YES | 0000000001 |
| 01-000002 | NO | 0000001001 |
| 01-000003 | NO | 0000002001 |
| ⋮ | ⋮ | ⋮ |
|  |  |  |

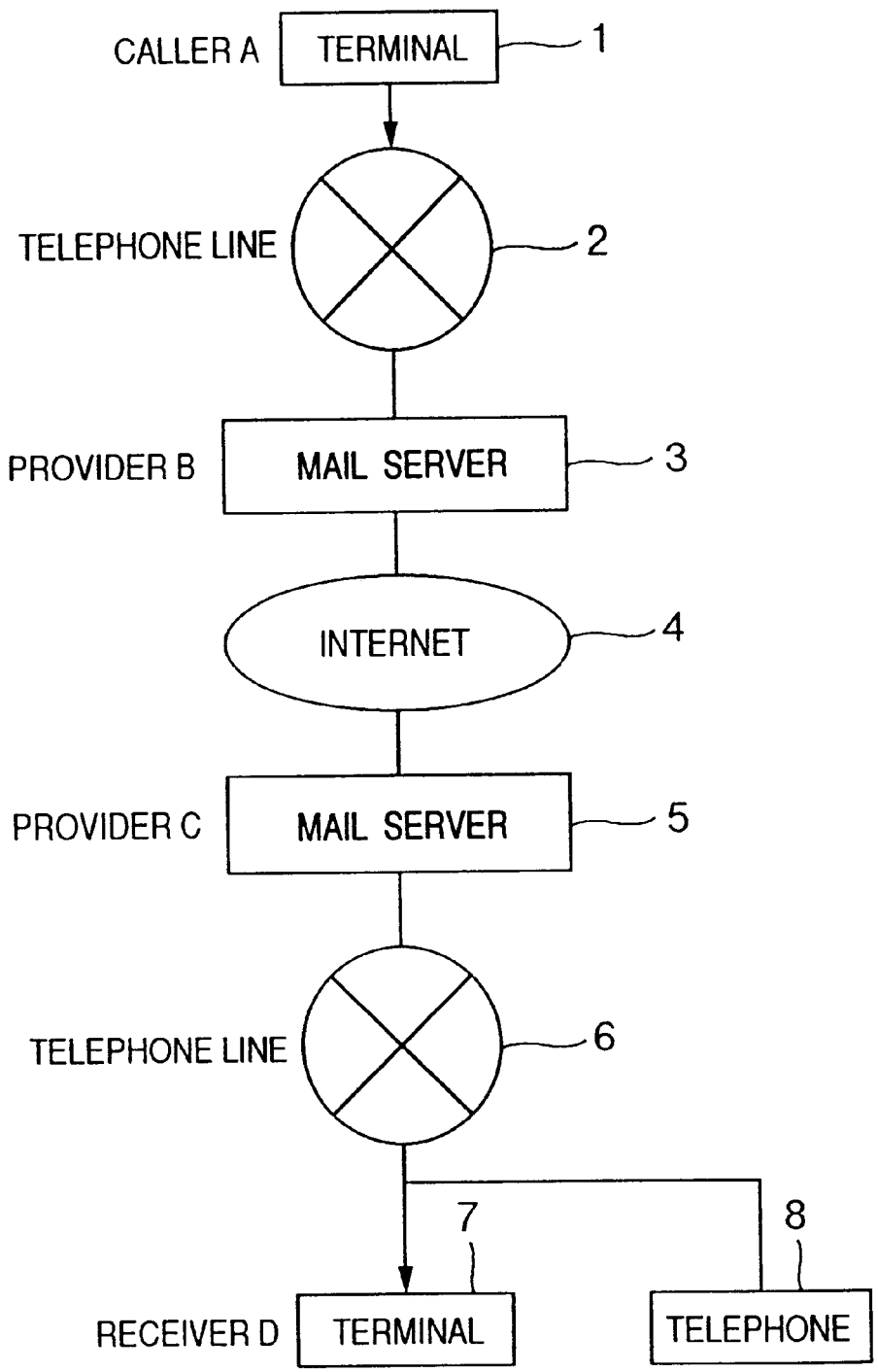

ELECTRONIC MAIL TERMINAL AND SYSTEM FOR AUTOMATICALLY DOWNLOADING ELECTRONIC MAIL

BACKGROUND OF THE INVENTION

Field of the Invention

The present invention relates to a system for delivering electronic mail through the internet and an electronic mail terminal used in the system.

Description of the Related Art

Recently electronic mail messages have been communicated through the internet by a wide range of users. The conventional system for delivering electronic mail through the internet will now be described. When a user individually wants to connect to the internet, the user has to connect his or her telephone line to the internet through a server located by a connecting company called a network service provider.

At first, the user places a call to an access point on a public telephone line where there exists a server provided by the network service provider through a modem that serves to convert analog data to be used by a telephone into digital data to be treated by a computer or vice versa. The internet has as a standard protocol called TCP/IP (Transmission Control Protocol/Internet Protocol). The connection with the internet (IP connection) through the telephone line is executed by internet connecting software. A series of connecting procedures that is employed is referred to as a dial-up IP connection. During the interval of the dial-up IP connection, the user's terminal is connected to the internet based on the TCP/IP. A terminal used by the conventional electronic mail is disclosed in JP-A-8-163269, for example.

Hereafter, a system for delivering electronic mail through the use of the conventional electronic mail terminal will be described. FIG. 15 illustrates the overall configuration of the conventional system for delivering electronic mail. As shown, the system is configured of a terminal 1 of a caller A, a telephone line 2, a mail server 3 of a provider B, the internet 4, a mail server 5 of a provider C, a telephone line 6, a terminal 7 of a receiver D, and a telephone 8.

At first, on the terminal 1, the caller A creates a mail message to be sent. Then, the caller A connects his or her terminal 1 to the mail server 3 of his or her contracted provider through a public telephone line. After the connection, the terminal 1 is operated to send mail data to the mail server 3. The mail server 3 of the provider makes sure of the destination of the mail and sends the mail to the mail server 5 of the provider located closest to the destination address through the internet 4. The mail server 5 temporarily saves the electronic mail. Then, the receiver D connects his or her terminal to the mail server 5 of the provider through the public telephone line in order to check if any electronic mail destined for him or her has been left in the mail server 5. If electronic mail has been left, the receiver D downloads the mail data from the mail server 5 to his or her terminal 7 and then can read the mail on the terminal 7.

Next, a description will be presented of caller ID. The caller ID is provided as a service through which a receiver gets to know the telephone number of a caller before picking up the telephone. The telephone number information of the caller reaches the receiver side as a modem signal before it serves to ring the receiver's telephone. The telephone number information is displayed on a display of the telephone providing the service for displaying a caller's telephone number. This service has been already implemented in the USA, England and Canada and will be implemented in Japan by NTT (Nippon Telegraph and Telephone Corporation).

When an ordinary user utilizes at home electronic mail through the internet with the dial-up IP connection, each time the user checks if electronic mail destined for him or her has been left, the user has to place a call to an access point provided by the network service provider for that purpose.

SUMMARY OF THE INVENTION

It is an object of the present invention to provide an electronic mail terminal which is arranged to display an electronic mail message in real time, reduce the communication cost, and improve the convenience of use in a system for delivering electronic mail through the internet.

In carrying out this object, the electronic mail terminal according to the invention is arranged to have means for checking a telephone number of the network connecting server so that when the server gives a call to the terminal, the terminal operates to automatically call back the network connecting server, connect itself to the internet and download the electronic mail.

This arrangement makes it possible to automate downloading of electronic mail messages received by the network connecting server to the destination terminal.

BRIEF DESCRIPTION OF THE DRAWINGS

FIG. 8 is a view showing an electronic mail management table according to the third embodiment of the present invention;

FIG. 15 is a diagram showing the overall configuration of the conventional system for delivering an electronic mail.

DETAILED DESCRIPTION OF THE PREFERRED EMBODIMENTS

First Embodiment

Figure 1:
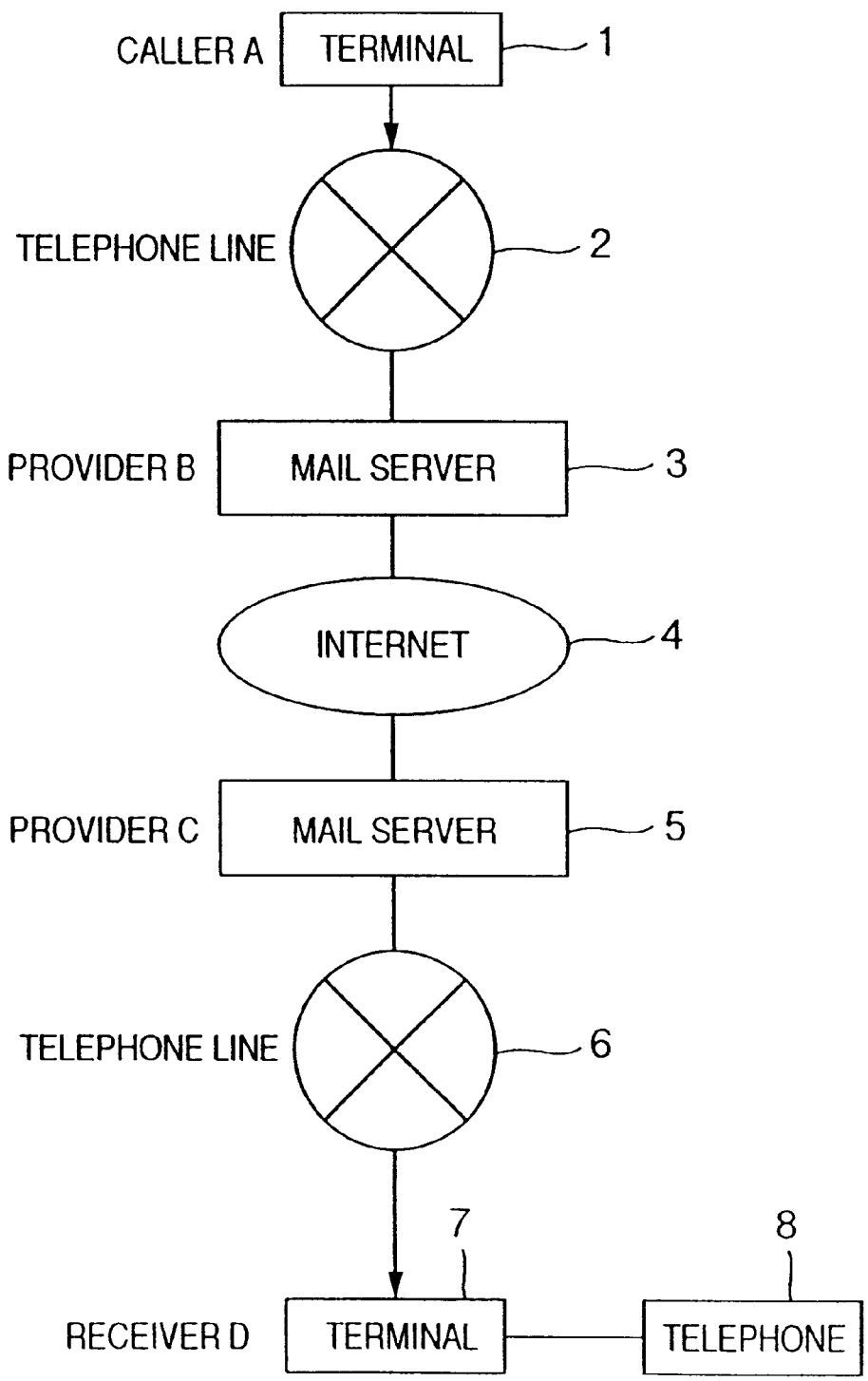
FIG. 1 is a diagram showing the overall configuration of a system for delivering electronic mail according to a first embodiment of the present invention.

FIG. 1 is a diagram showing the overall configuration of a system for delivering electronic mail according to a first embodiment of the invention. As shown, the system includes a terminal 1 used by a caller A to create and transmit electronic mail, a telephone line 2 for connecting a provider B with the terminal 1 of the caller A, a mail server 3 for temporarily saving the electronic mail transmitted by the caller A through the telephone line 2 and transmitting the electronic mail to a provider C through the internet 4, the internet 4, a mail server 5 for receiving the electronic mail from the provider B through the internet 4 and temporarily saving the electronic mail, a telephone line 6 for connecting the provider C with the terminal 2 of a receiver D, a terminal 7 used by the receiver D to receive and read the electronic mail, and a telephone 8 of the receiver B.

Figure 2:
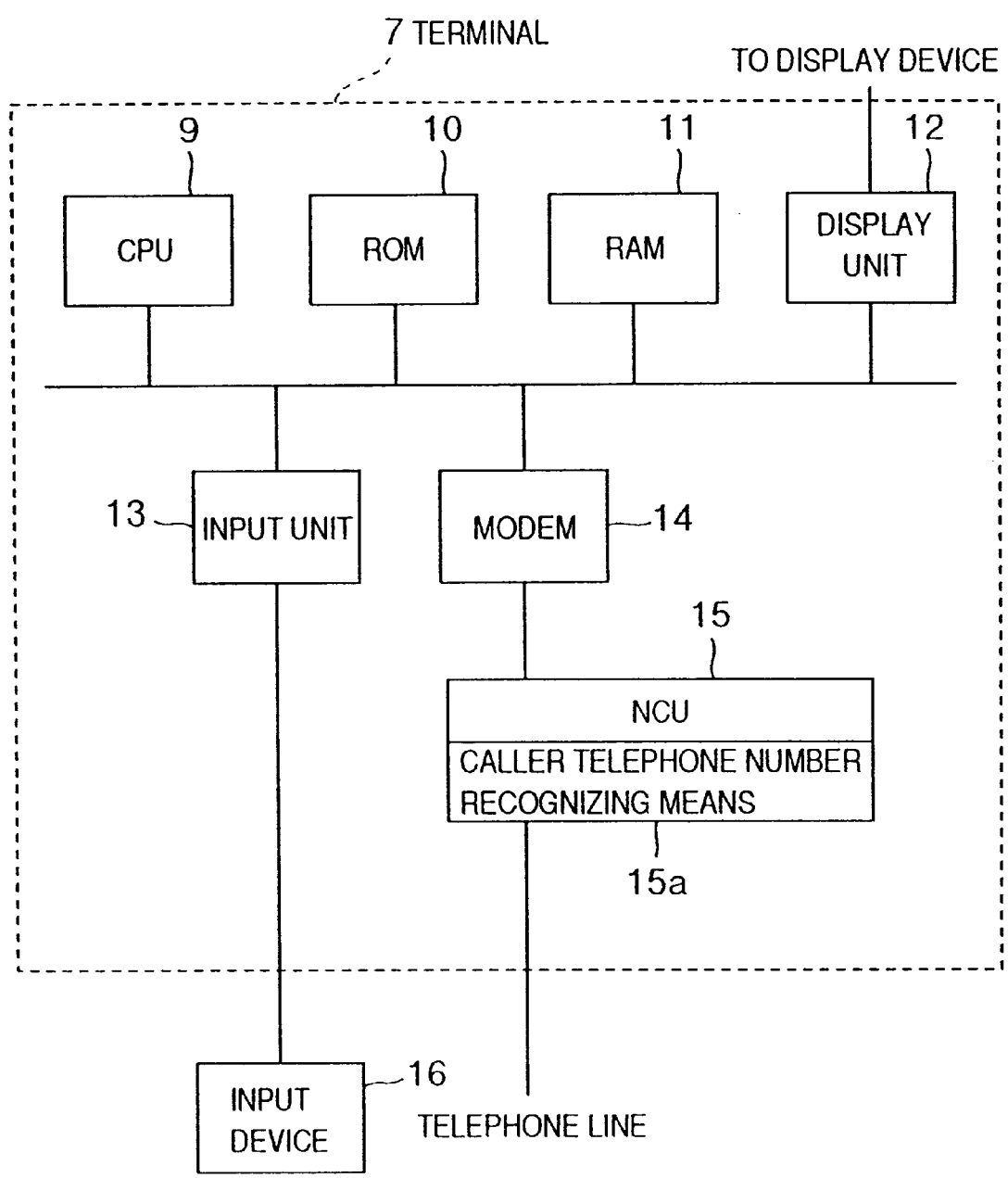
FIG. 2 is a block diagram showing an electronic mail terminal according to the first embodiment of the present invention.

FIG. 2 is a block diagram showing an electronic mail terminal according to the first embodiment of the invention. In FIG. 2, the terminal 7 serves to transmit and receive the electronic mail. The terminal 7 is arranged to have a CPU 9, a ROM for storing a program for controlling the system, a RAM 11 for storing data, a display unit 12 for interfacing with a display device, an input unit 13 for interfacing with an input device 16, a modem for converting analog data to be used by the telephone into digital data to be processed by a computer or vice versa, and an NCU (Network Control Unit) 15 for interfacing with a network. The NCU 15 provides a caller telephone number recognizing means 15a.

Next, the operation will be described below. When a ringing tone signal is inputted into the NCU 15 through a telephone line, the caller telephone number recognizing means 15a located inside of the NCU 15 operates to recognize the caller telephone number and put it into the RAM 11. Next, the caller telephone number stored in the RAM 11 is compared with a specified caller telephone number prestored in the ROM 10. If they match, the terminal 7 waits for termination of the ringing tone signal. Then, the terminal 7 operates to place a call to the caller telephone number stored in the RAM 11 through the modem 14 and the NCU 15. After the NCU recognizes the connection with the caller, a connecting procedure with the mail server is executed with communication software stored in the ROM 10. On termination of the connecting procedure, the terminal 7 operates to download the electronic mail left for itself from the mail server to the RAM 11 through the NCU 15 and the modem 14. After it is downloaded, the terminal 7 operates to disconnect itself from the mail server, cut off the telephone line, and return to a standby state. Unless the caller telephone number matches the specified telephone number pre-stored in ROM 10, the terminal 7 enters into the standby state in which the ringing signal is awaited.

Figure 3:
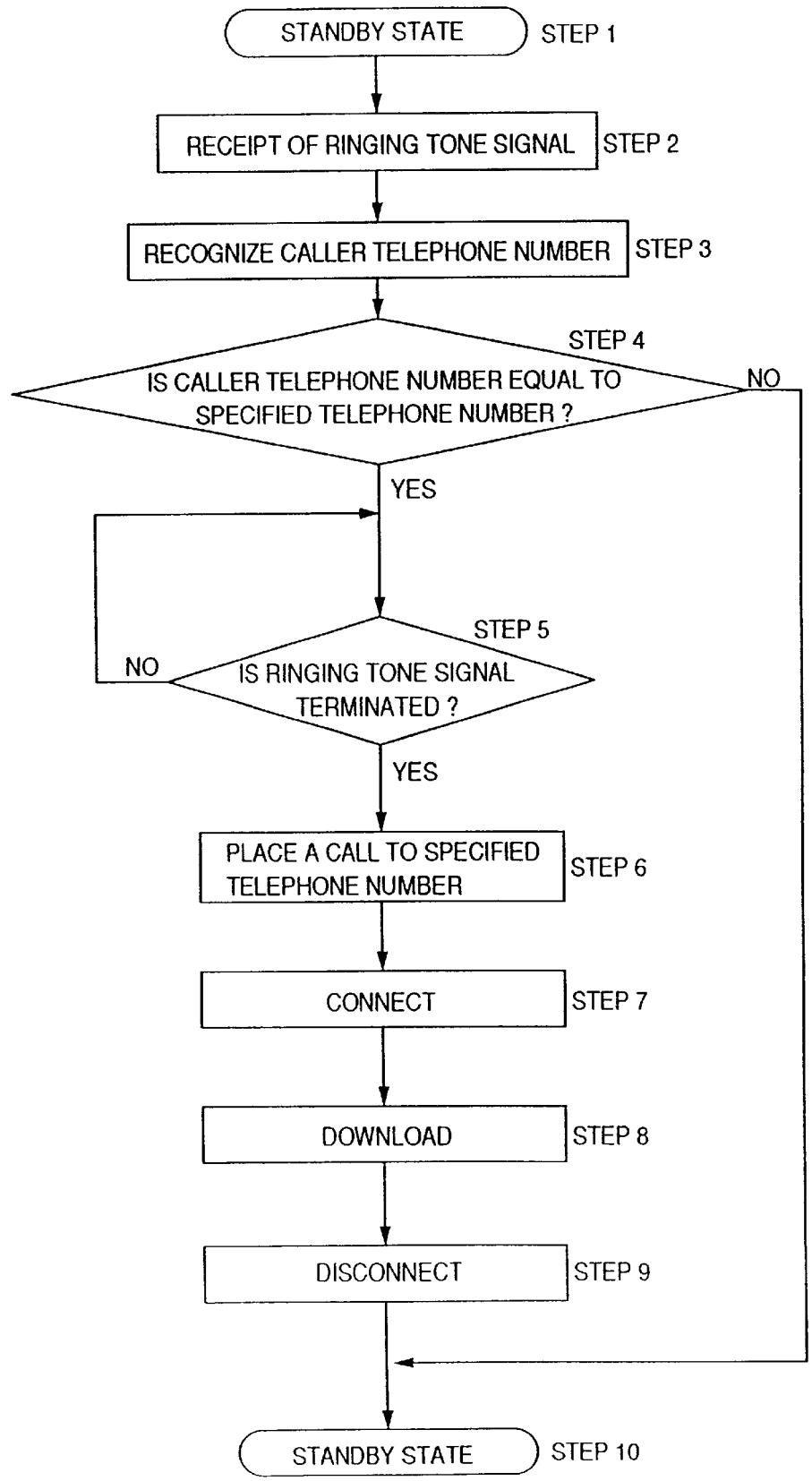
FIG. 3 is a flowchart showing control of the electronic mail terminal according to the first embodiment of the present invention.

FIG. 3 is a flowchart showing control of the electronic mail terminal according to the first embodiment of the invention. At first, the electronic mail terminal is waiting for an input of the ringing tone signal (standby state, step 1). When the ringing signal is inputted (step 2), the terminal recognizes the caller telephone number (step 3) and then stores it in the RAM 11. Then, the caller telephone number stored in the RAM 11 is compared with the specified telephone number stored in the ROM 10 (step 4). If it matches the specified telephone number, the terminal waits for termination of the ringing signal (step 5). Next, the terminal operates to place a call to the caller of the telephone number stored in the RAM 11 (step 6). When the terminal is connected with the caller, the connecting procedure with the mail server is executed through the communication software stored in the ROM 10 (step 7). On termination of the connecting procedure, the terminal operates to download the electronic mail for itself from the mail server (step 8). After it is downloaded, the disconnecting procedure (step 9) is executed. Concretely, the terminal operates to disconnect itself from the mail server and ring off. Then, the terminal returns to the standby state (step 10). Unless the caller telephone number matches the specified telephone number stored in the ROM 10, the terminal keeps the standby state in which the ringing signal is awaited.

As set forth above, the electronic mail terminal of the invention automates the process from the input of the ringing tone to the downloading of the mail. This eliminates the necessity for the user to do a dial-up IP connection for checking if mail has been left for himself or herself.

Figure 4:
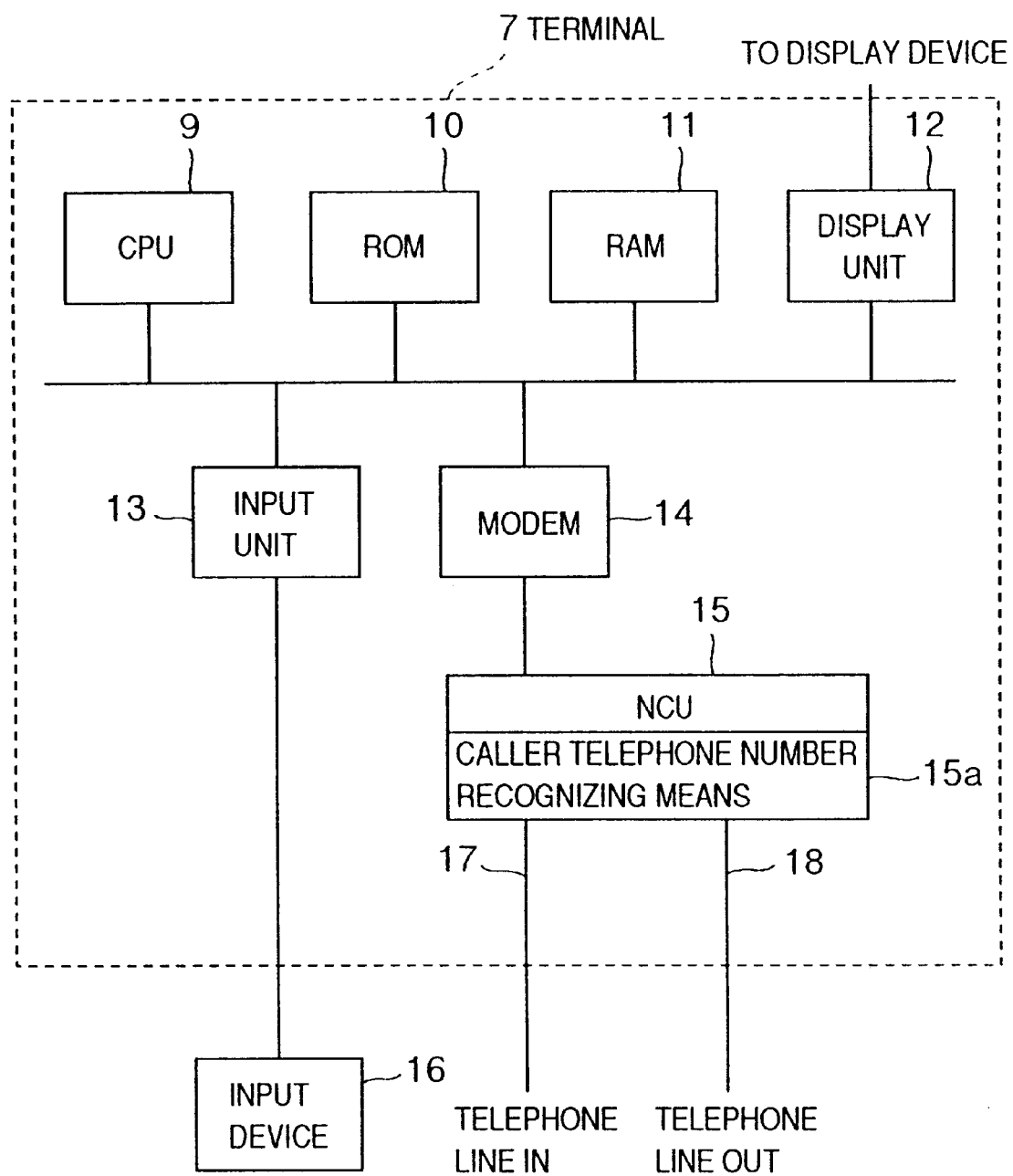
FIG. 4 is a block diagram showing an electronic mail terminal according to a second embodiment of the present invention.

Second Embodiment FIG. 4 is a block diagram showing an electronic mail terminal according to the second embodiment of the invention. In FIG. 4, the electronic mail terminal serves to transmit and receive the electronic mail. The terminal is arranged to have a CPU 9, a ROM 10 for storing a program for controlling the system, a RAM 11 for storing data, a display unit 12 for interfacing with a display device, an input unit 13 for interfacing with an input device 16, a modem 14 for converting analog data to be used by the telephone into digital data to be processed by a computer or vice versa, and an NCU (Network Control Unit) 15.

Next, the operation of the terminal will be described below. The NCU 15 switches to an OFF state the connection with a telephone line OUT 18, that is, the connection of the terminal itself with the telephone. When the ringing signal is inputted to the NCU 15 through the telephone line IN 17, the caller telephone number recognizing means 15a located inside of the NCU 15 recognizes the caller telephone number and puts it in the RAM 11. Then, the caller telephone number stored in the RAM 11 is compared with the specified telephone number stored in the ROM 10. If they match, the NCU 15 operates to switch to the OFF state the telephone line OUT 18 for connecting the terminal with the telephone. Then, the termination of the ringing signal is awaited.

Those series of operations make it possible to avoid ringing if the telephone of the specified telephone number places a call to the terminal, thereby eliminating an unnecessary pick-up and put-back of the handset by the user.

Then, the terminal calls back to the caller telephone number stored in the RAM through the modem 14 and the NCU 15. After the NCU 15 recognizes the connection with the caller, the connecting procedure with the mail server is executed with the communication software stored in the ROM 10. On the termination of the connecting procedure, the terminal operates to download the electronic mail for itself from the mail server to the RAM 11 through the NCU 15 and the modem 14. After the mail is downloaded, the disconnecting procedure is executed. Concretely, the terminal operates to disconnect itself from the mail server, ring off, and return to a standby state. The caller telephone stored in the RAM 11 is compared with the specified telephone numbers stored in the ROM 10. If they do not match, the NCU 15 operates to switch to an ON state the telephone line OUT 18 for connecting the terminal with the telephone.

This series of operations make it possible for the telephone to ring as usual.

Figure 5:
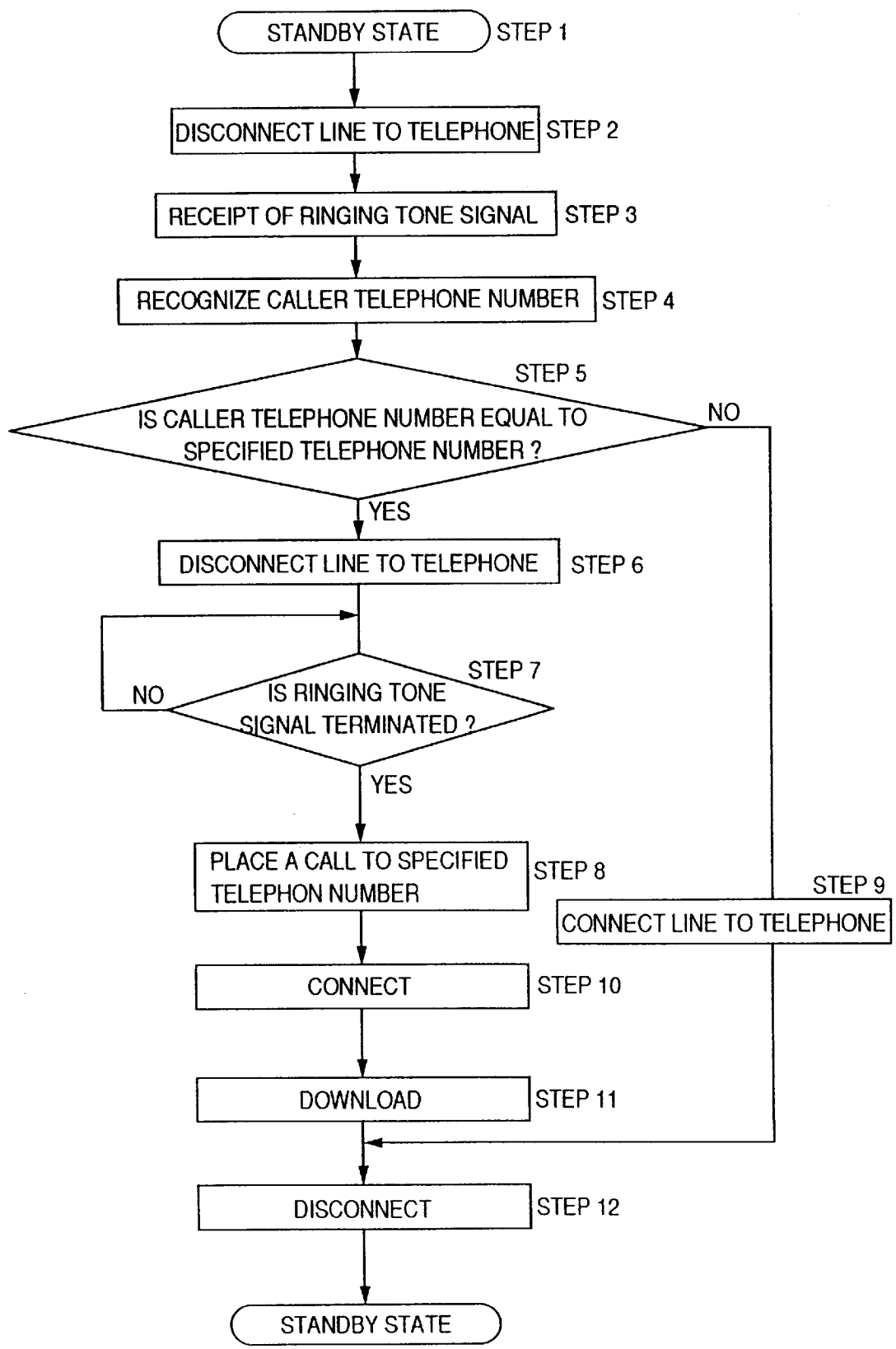
FIG. 5 is a flowchart showing control of the electronic mail terminal according to the second embodiment of the present invention.

FIG. 5 is a flowchart showing control of the electronic mail terminal according to the second embodiment of the invention. At first, the terminal stays in the waiting state for the ringing signal (standby state, step 1). Next, the terminal operates to switch the connection between the terminal and the telephone to an OFF state (step 2). When the ringing signal is inputted (step 3), the terminal recognizes the caller telephone number (step 4) and stores it in the RAM 11. Next, the caller telephone number stored in the RAM 11 is compared with the specified telephone number stored in the ROM 10 (step 5). If they match, the terminal operates to switch to an OFF state the connection of the terminal itself with the telephone (step 6). Then, the termination of the telephone ringing signal is awaited (step 7). Next, the terminal operates to call back the caller of the telephone number stored in the RAM 11 (step 8). When the connection with the caller telephone number is established, the connecting procedure with the mail server is executed with the communication software stored in the ROM 10 (step 10). On the termination of the connecting procedure, the terminal operates to download the electronic mail for itself from the mail server (step 11). After it is downloaded, the disconnecting procedure is done (step 12). Concretely, the terminal operates to disconnect itself from the mail server and ring off, and then return to a standby state (step 13).

If the caller telephone number stored in the RAM 11 does not coincide with the specified telephone number stored in the ROM 10, the terminal operates to switch the connection with the telephone to an ON state (step 9). Next, the terminal keeps the ON state until the same ringing tone is terminated. On the termination of the ringing tone, the terminal enters into the standby state (step 13) in which an input of the ringing tone is awaited.

Third Embodiment

Figure 6:
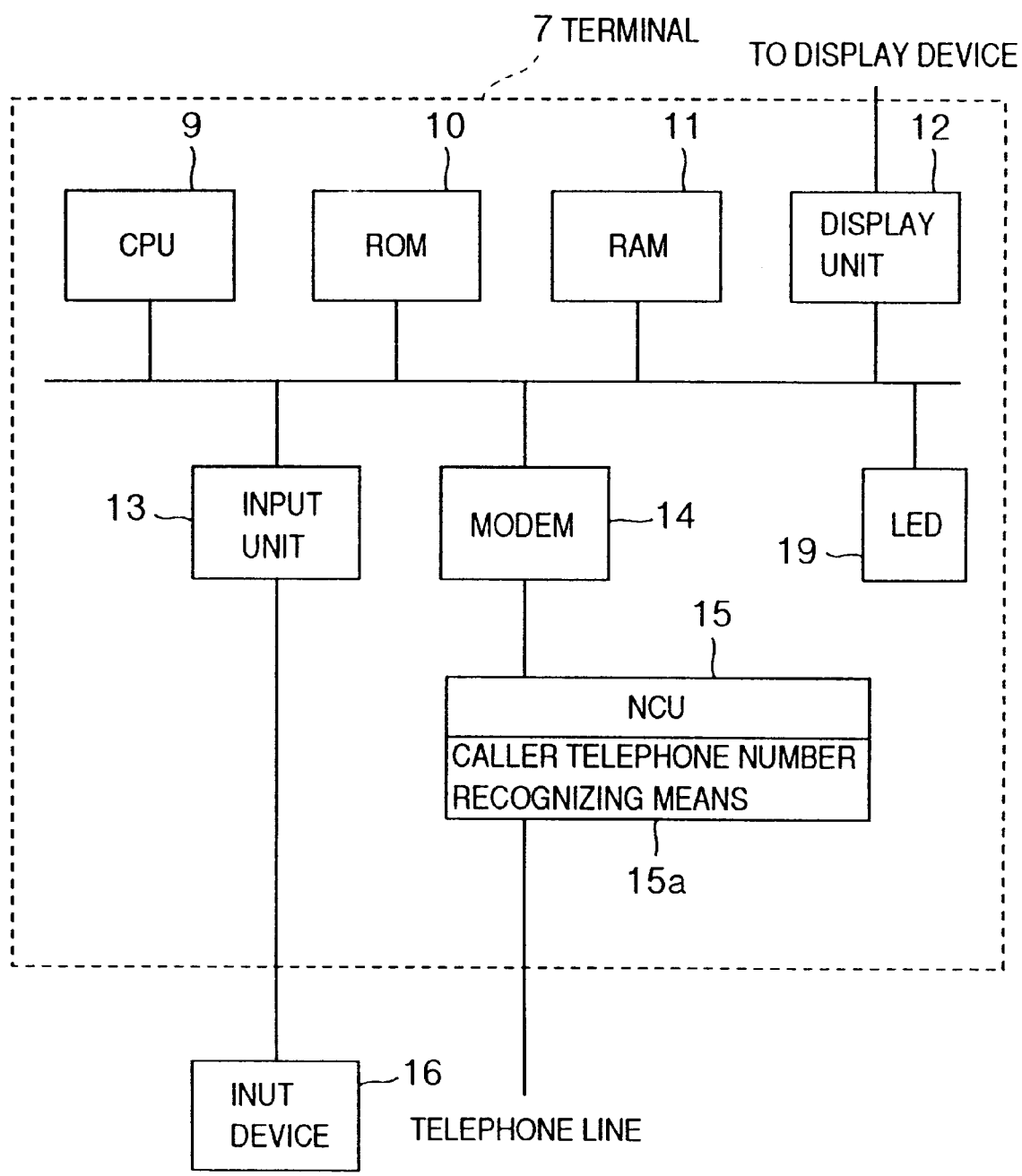
FIG. 6 is a block diagram showing an electronic mail terminal according to a third embodiment of the present invention.

FIG. 6 is a block diagram showing an electronic mail terminal according to a third embodiment of the invention. In FIG. 6, the electronic mail terminal serves to transmit and receive electronic mail. The terminal is arranged to have a CPU 9, a ROM 10 for storing a program for controlling the system, a RAM 11 for storing data, a display unit 12 for interfacing with a display device, an input unit 13 for interfacing with an input device 16, a modem 14 for converting analog data to be used by a telephone into digital data to be processed by a computer or vice versa, an NCU (Network Control Unit) 15 for interfacing with a network, and a LED (Light Emitting Diode) 19 for indicating the arrival of electronic mail.

FIG. 8 shows a management table 20 for electronic mail used in the third embodiment of the invention. The management table for electronic mail is a table for managing each electronic mail message on the terminal and is arranged to have an electronic mail ID 21, an access code 22, and a mail data pointer 23. The electronic mail ID 21 is an identifier used for identifying an electronic mail message received for itself. The access code 22 stores "no" if the user does not make an access to the electronic mail message received for himself or herself or "yes" if the user stores the electronic mail message. By checking this item, it can be determined if any unaccessed electronic mail is left. The mail data pointer 23 indicates the storage location of the electronic mail message.

Hereafter, the operation will be described. In the initialization, the LED 19 is activated. When the ringing tone is inputted to the NCU 15 through the telephone line, the telephone number recognizing means 15a located inside of the NCU 15 recognizes the caller telephone number and puts it in the RAM 11. Then, the caller telephone number stored in the RAM 11 is compared with the specified telephone number stored in the ROM 10. If both are met, the termination of the ringing tone is awaited. Then, the terminal operates to call back the caller of the telephone number stored in the RAM 11 through the modem 14 and the NCU 15. After the NCU 15 recognizes the connection with the caller, the connecting procedure with the mail server is executed with the communication software stored in the ROM 10. At the termination of the connecting procedure, the terminal operates to download the electronic mail for itself from the mail server to the RAM 11 through the NCU 15 and the modem 14.

After the electronic mail is downloaded, by referring to the electronic mail management table stored in the ROM 11, it is checked if any unaccessed mail is left. If no unaccessed mail is left, the LED 19 is turned off. If one or more messages have not been accessed, the LED 19 is lit up. Then, the disconnecting procedure is executed. Concretely, the terminal operates to disconnect itself from the mail server, ring off, and then returns to the standby state. If the caller telephone number stored in the RAM 11 does not coincide with the specified telephone number stored in the ROM 10, the terminal enters into the standby state in which an input of the ringing tone is awaited.

These series of operations make it possible to activate the LED if any unaccessed electronic mail is left, thereby eliminating the need for the user to operate the electronic mail terminal for checking if mail for the user has been received and making the receipt of electronic mail known through the user's visual recognition of the LED.

Figure 7:
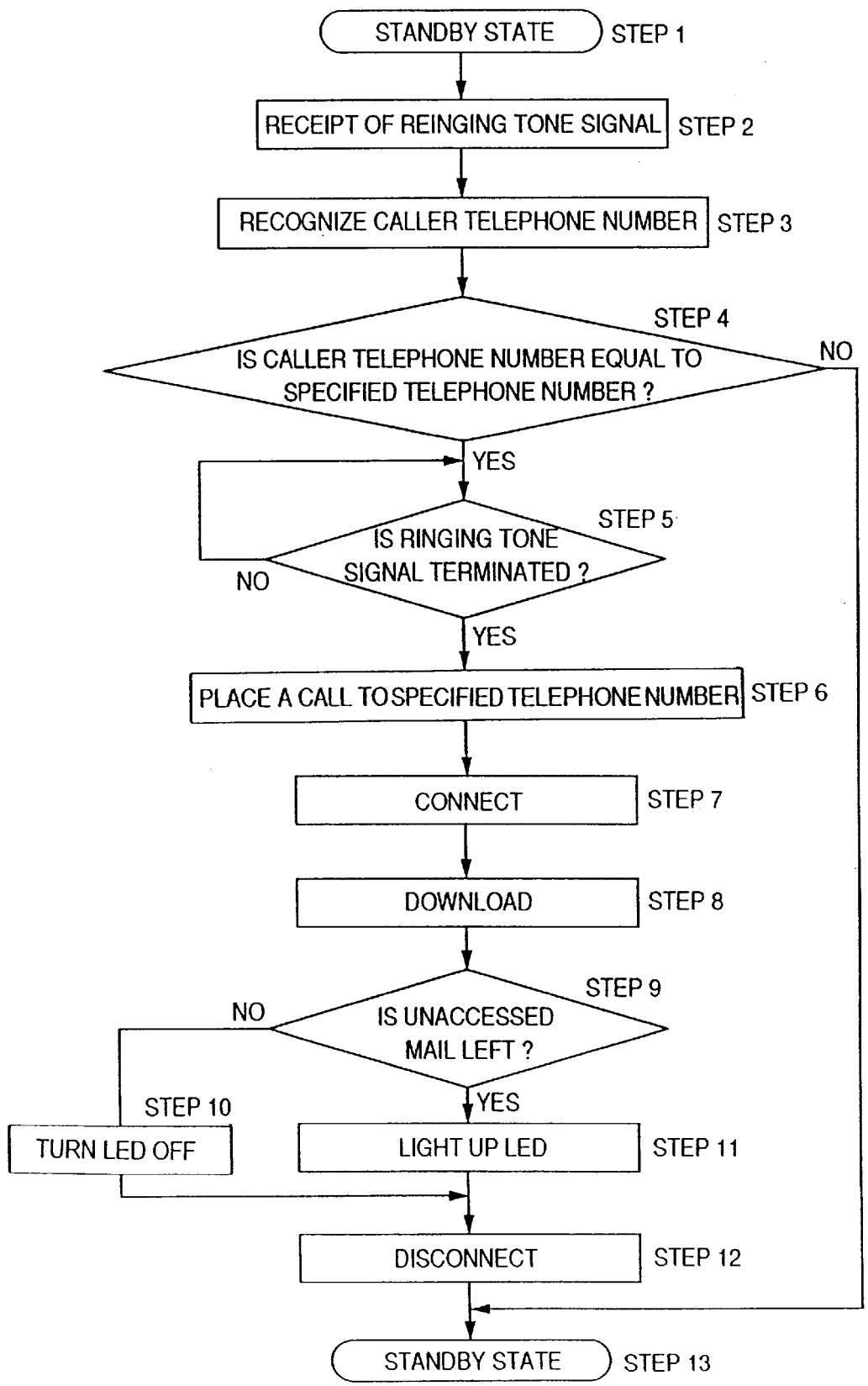
FIG. 7 is a flowchart showing control of the electronic mail terminal according to the third embodiment of the present invention.

FIG. 7 is a flowchart showing control of the electronic mail terminal according to the third embodiment of the invention. At the initializing step, the LED 19 is lit up. Then, the terminal enters into the waiting state for a ringing tone (standby state, step 1). When the ringing tone is inputted (step 2), the terminal recognizes the caller telephone number (step 3) and stores it in the RAM 11. Then, the caller telephone number stored in the RAM 11 is compared with the specified telephone number stored in the ROM 10 (step 4). If they match, the terminal waits for termination of the ringing tone (step 5). Next, the terminal operates to call back the caller of the telephone number stored in the RAM 11 (step 6). On the connection with the caller by telephone, the connecting procedure with the mail server is executed with the communication software stored in the ROM 10 (step 7). On the termination of the connecting procedure, the electronic mail destined for the user is downloaded from the mail server (step 8).

After the electronic mail is downloaded, it is checked if any unaccessed mail is left (step 9). If no, the LED 19 is turned off (step 10). If yes, the LED 19 is lit up (step 11). The disconnecting procedure is executed (step 12). Concretely, the terminal operates to disconnect itself from the mail server, ring off, and then returns to the standby state (step 13). If the numbers do not match, the terminal enters into the standby state (step 13) in which the input of the ringing tone is awaited. If the electronic mail is read by the receiver D, the LED 19 is turned off.

Fourth Embodiment

Figure 9:
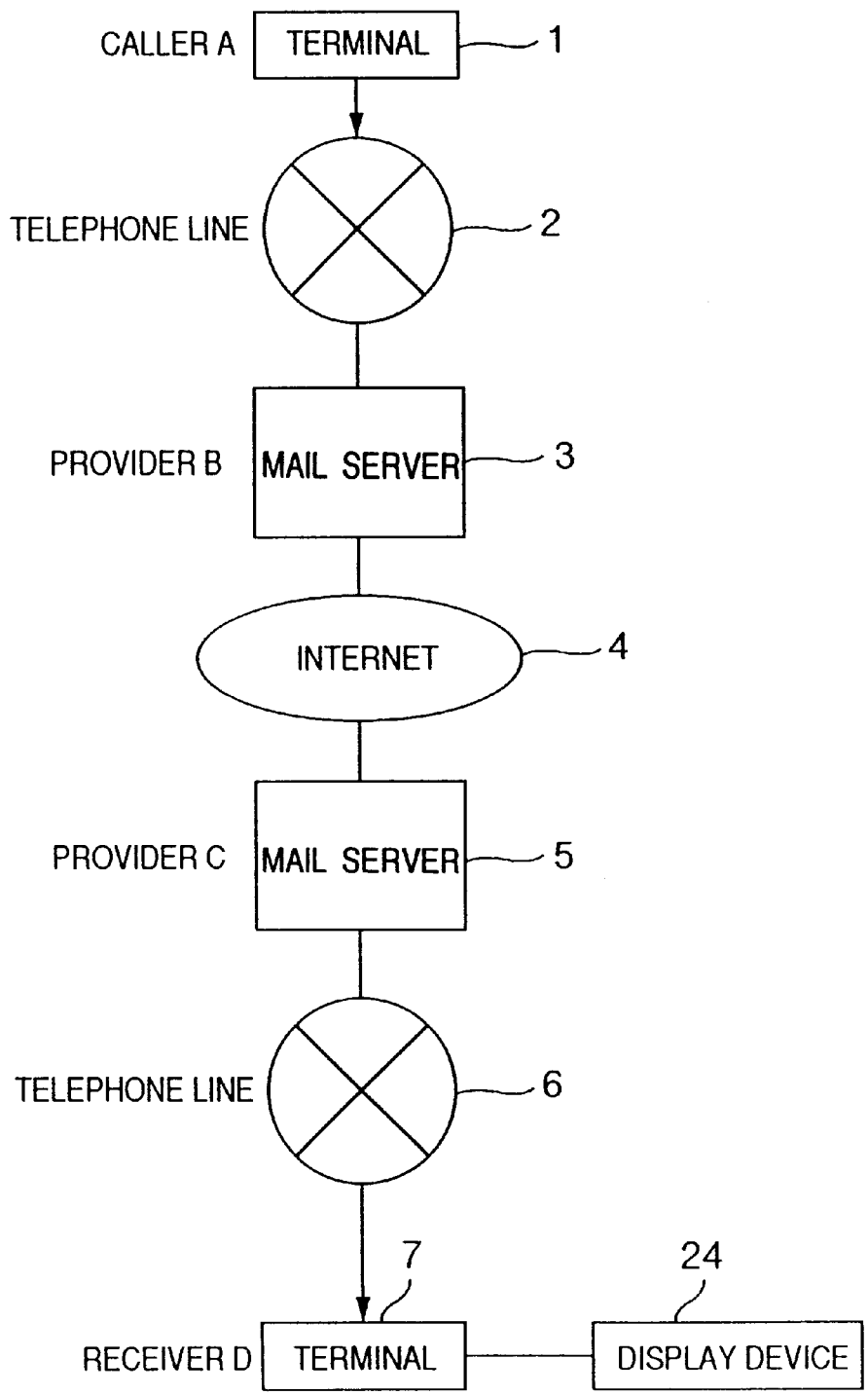
FIG. 9 is a diagram showing the overall configuration of a system for delivering electronic mail according to a fourth embodiment of the present invention.

FIG. 9 shows the overall configuration of a system for delivering electronic mail according to a fourth embodiment of the invention. In FIG. 9, the system includes an electronic mail terminal 1 used by a transmitter A for creating and transmitting electronic mail, a telephone line 2 for connecting an internet provider B with the terminal 1 of the transmitter A, a mail server 3 for temporarily storing electronic mail transmitted by the transmitter A through the telephone line 2 and transmitting it to an internet provider C through internet 4, the internet 4, a mail server 5 for receiving electronic mail from the internet provider B through the internet 4 and temporarily storing it, a telephone line 6 for connecting the internet provider C with the terminal 2 of a receiver D, a terminal 7 in which the receiver D downloads the electronic main and can read it, and a display device 2 of the receiver B for displaying the received mail information.

Figure 10:
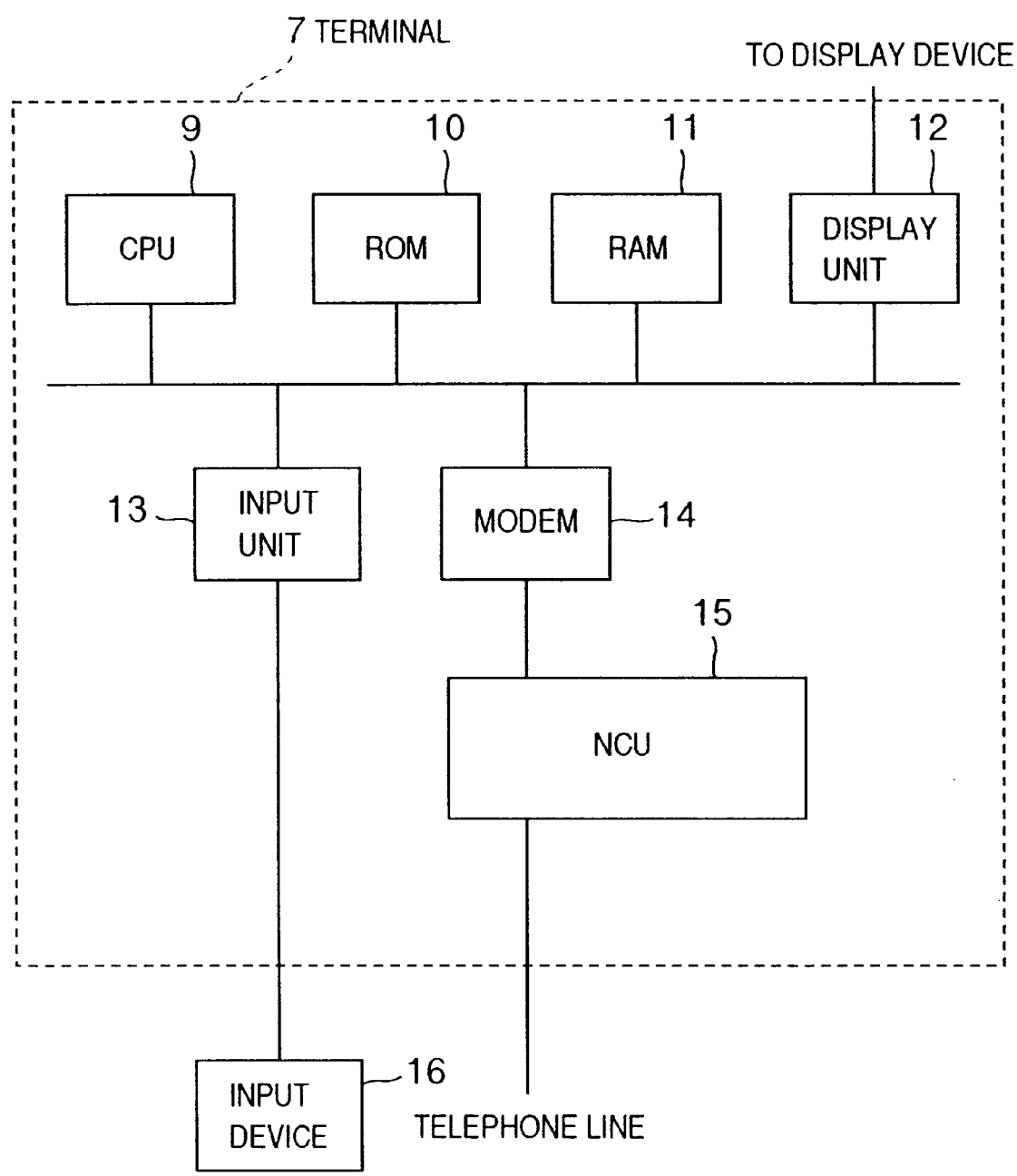
FIG. 10 is a block diagram showing an electronic mail terminal according to the fourth embodiment of the present invention.

FIG. 10 is a block diagram showing an electronic mail terminal according to the fourth embodiment of the invention. In FIG. 10, the terminal 7 serves to transmit and receive electronic mail and is arranged to have a CPU 9, a ROM for storing a program for controlling the system, a RAM 11 for storing data, a display unit 12 for interfacing with the display device, an input unit 13 for interfacing with an input device, a modem 14 for converting analog data to be used by the telephone into digital data to be processed by a computer or vice versa, an NCU (Network Control Unit) for interfacing with the internet, and a display device 24 for displaying the information of the received electronic mail.

Next, the operation will be described in conjunction with the block diagram of FIG. 10.

When a ringing tone is inputted from the internet provider to the NCU 15 through the telephone line, the caller telephone number acquisition means located inside of the NCU recognizes the caller telephone number and puts it in the RAM 11. Then, the caller telephone number stored in the RAM 11 is compared with the specified telephone number stored in the ROM 10. If they match, the terminal 7 determines that it is an announcement of electronic mail received from the internet provider and waits for a fixed-time absence of the input of the ringing tone given by the telephone currently trying to connect to the terminal itself. Then, the terminal 7 operates to call back the caller of the telephone number stored in the RAM 11, that is, the internet provider, through the modem 14 and the NCU 15 (the operation of which is normally referred to as a call back). After the terminal 7 is connected by telephone with the internet provider through the NCU 15, the connecting procedure with the electronic mail server is executed with the communication software stored in the ROM 10. On the completion of the connecting procedure, the electronic mail information or message for the user is downloaded from the mail server of the internet provider to the RAM 11 through the NCU 15 and the modem 14. The electronic mail information is generated from the electronic mail data accumulated in the electronic mail server of the internet provider through the effect of a program for retrieving the electronic mail information. The program is operated at a system managing mode and therefore may be accessed to all electronic mail data. After the received electronic mail information is downloaded, the disconnecting procedure is executed. Then, the number of the received electronic mail messages is retrieved among the downloaded received electronic mail information. The retrieved number is displayed on the display device 24 through the display unit 12.

After the number is displayed on the display device 24, the electronic mail terminal 1 is returned to the standby state.

If the caller telephone number is different from the specified telephone number or cannot be recognized, the terminal determines that it is not an announcement of electronic mail information given by the internet provider and returns to the standby state without doing a call back.

Figure 12:
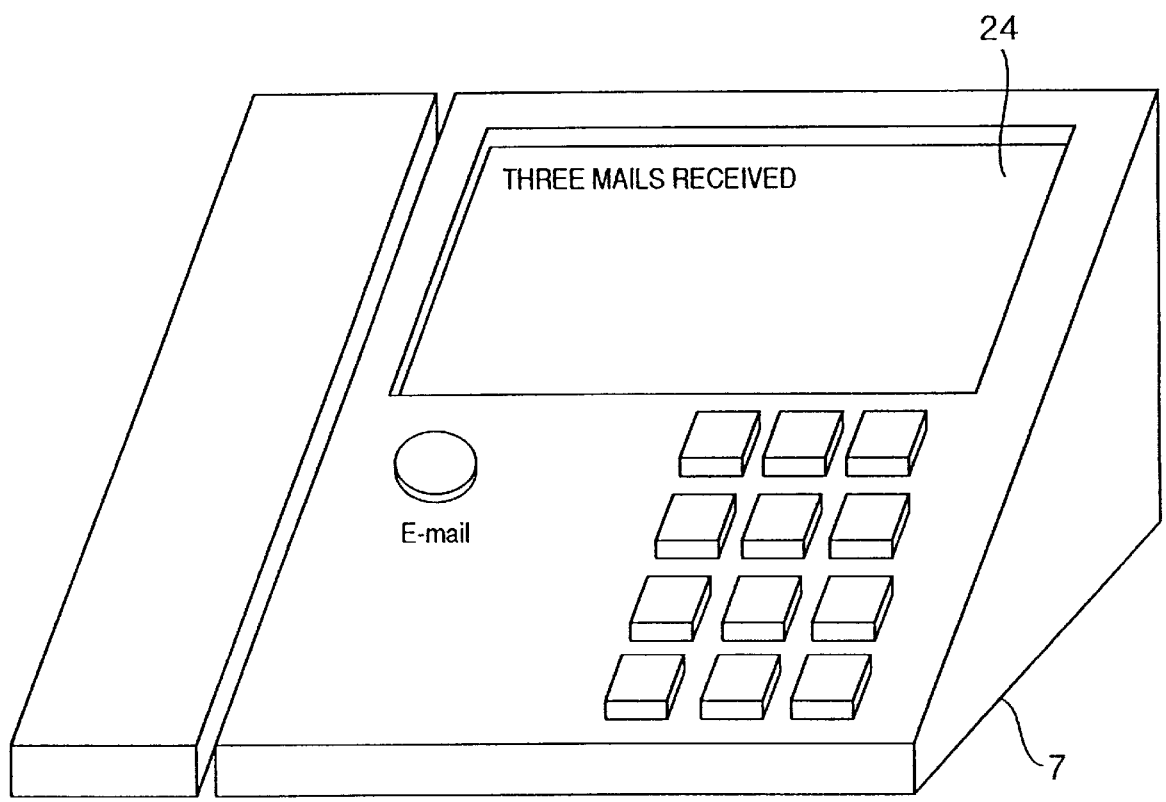
FIG. 12 is a perspective view showing the electronic mail terminal according to the fourth embodiment of the present invention.

Herein, for describing how the number information is displayed on the display device 24 of the electronic mail terminal 1, FIG. 12 shows outer appearance of the electronic mail terminal according to the fourth embodiment of the invention. The information about the number of the electronic mails is displayed on the display device 24 of the electronic mail terminal 1.

Figure 13:
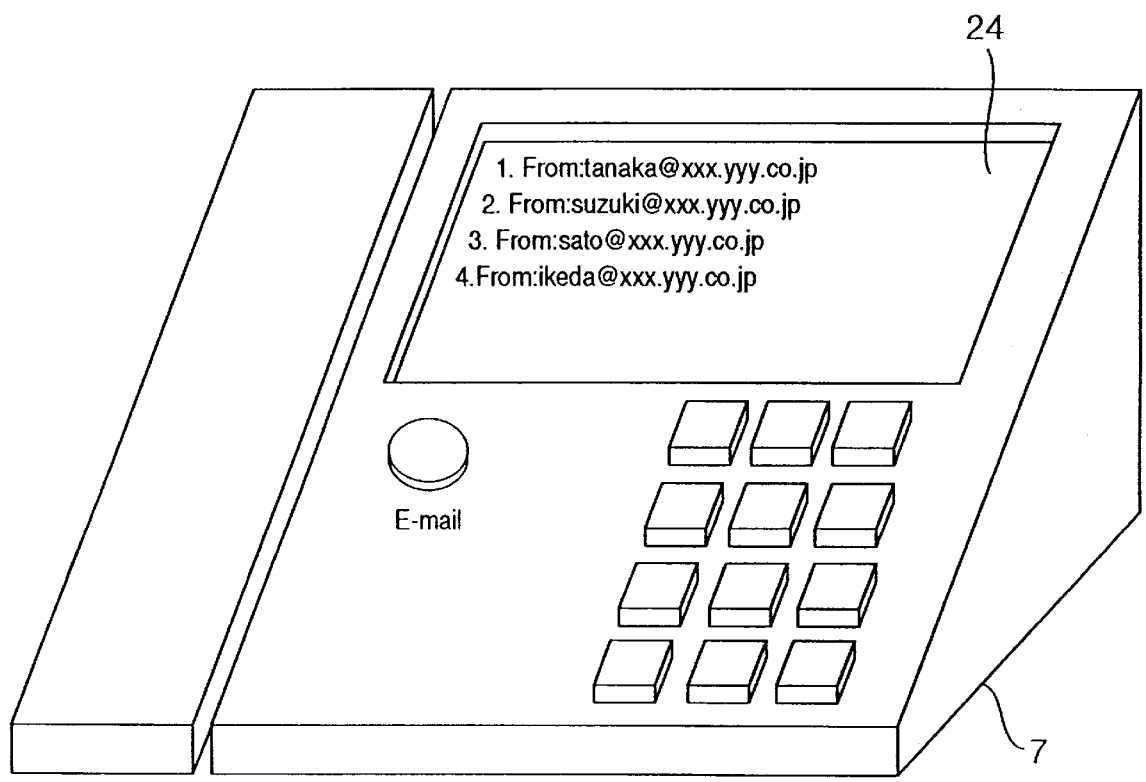
FIG. 13 is a perspective view showing an operation of the electronic mail terminal according to the fourth embodiment of the present invention.
Figure 14:
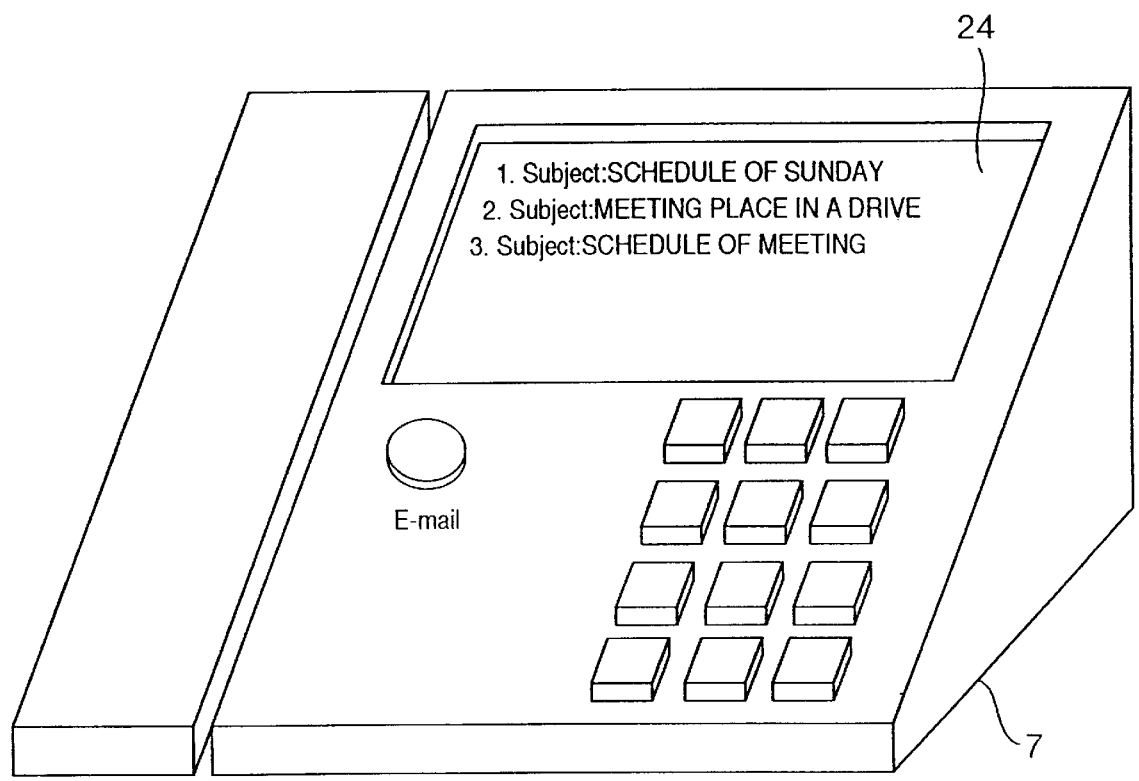
FIG. 14 is a perspective view showing another operation of the electronic mail terminal according to the fourth embodiment of the present invention.

As shown in FIG. 13, the display device 24 may display the information about the senders of the electronic mail obtained from the information about the downloaded received electronic mail. Alternatively as shown in FIG. 14, information about the titles of the electronic mail messages may be displayed.

The number of the received electronic mail messages, the information about the senders, and the information about the titles may be displayed on the display device 24. Hence, without having to handle the electronic mail terminal, the user can get to know the information about the electronic mail messages, and decide the urgency of each electronic mail messages based on the information.

Figure 11:
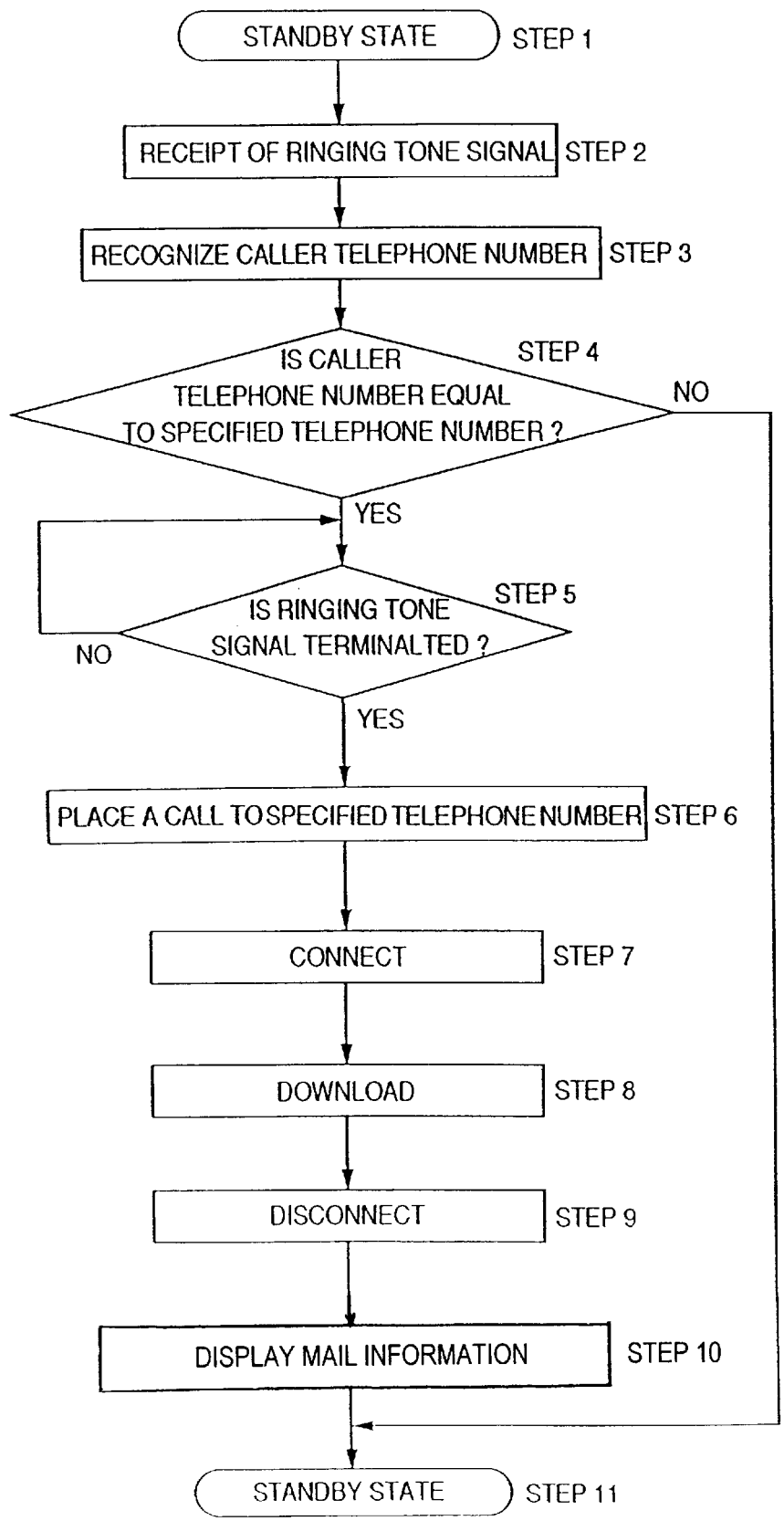
FIG. 11 is a flowchart showing control of the electronic mail terminal according to the fourth embodiment of the present invention.

FIG. 11 is a flowchart showing control of the electronic mail terminal according to the fourth embodiment of the invention. At first, the terminal enters into the waiting state for a ringing tone signal (standby state, step 1). When the ringing tone signal is inputted (step 2), the caller telephone number data is passing on the line. Hence, the caller telephone number detecting means operates to recognize the caller telephone number (step 3) and then puts it in the RAM. Next, the caller telephone number stored in the RAM is compared with the specified telephone number stored in the ROM (step 4). If they match, the terminal waits for a fixed-time absence of the input of the ringing tone signal (step 5). When the connection with the internet provider by telephone is established, the connecting procedure with the mail server is executed on the communication software stored in the ROM (step 7). On the termination of the connecting procedure, the terminal operates to download the information about the electronic mail for the user from the mail server to the RAM (step 8). After the information is downloaded, the disconnecting procedure is executed (step 9) for disconnecting the terminal from the mail server. Next, the data about the number of the received electronic mail messages is retrieved from the information about the received electronic mails stored in the RAM and then the number is displayed on the display device through the display unit (step 10). Then, the telephone line is disconnected from the terminal. The terminal returns to the standby state (step 11).

On the other hand, if the caller telephone number does not coincide with the specified telephone number, the terminal enters into the standby state (step 10) in which an input of the next ringing tone signal is awaited.

The foregoing description has been presented based on the assumption that the medium for connecting the provider with the terminal is a telephone line composed of a normal cord. However, the present invention may apply to another connecting form, for example, a wireless telephone system such as a portable telephone or a personal handyphone system.

As set forth above, the system according to the present invention is configured to have means for checking a telephone number of the server for connecting with the network so that when the server calls the electronic mail terminal, the terminal automatically calls back the server for connecting with the network and downloads the electronic mail for itself. This arrangement makes it possible for the electronic mail terminal of a user to automatically download the electronic mail for himself or herself. In order for the user to check if any electronic mail for the user is left in the server, the user does not need to place a call to an access point provided by the network service provider for the purpose of checking receipt of the electronic mail for the user. This system thus enables a reduction in the communication cost for electronic mail and permits the electronic mail to be obtained on the corresponding terminal substantially in real time.

Further, if the network server for receiving the electronic mail places a call to the terminal, the telephone connected to the terminal does not ring, so that the user does not need to wastefully pick up and put back the handset.

Further, the terminal provides means for noticing the receipt. Hence, if any unaccessed electronic mail is left, the user does not need to handle the electronic mail terminal for the purpose of checking if mail has been received and can visually recognize the receipt through the receipt noticing means.

If the terminal provides the display device, the display device operates to indicate the received number of electronic mail messages, information about the senders, and information about the subjects or titles. Hence, without having to handle the electronic mail terminal, the user can obtain the electronic mail information and decide the urgency of the electronic mail based on the information.

What is claimed is:

1. An electronic mail terminal comprising:
   an interface unit to be connected to a telephone line;
   detecting means for detecting a caller telephone number obtained by said interface unit;
   comparing means for comparing said caller telephone number detected by said detecting means with a telephone number of a server connected to a network so as to determine whether or not said caller telephone number and said telephone number of said server coincide with each other;
   calling means for initiating a call to said server so as to connect said electronic mail terminal to said server through said interface unit;
   a memory for storing information about received electronic mail; and
   a control unit, when said comparing means determines that an incoming call is from said server, for controlling said calling means to automatically call back said server so as to connect said electronic mail terminal to said server and download electronic mail information stored in said server, and for controlling said memory to store the electronic mail information.

2. The electronic mail terminal as claimed in claim 1, wherein said interface unit includes a line to be connected to a telephone and operates to disconnect said line when said comparing means determines that the incoming call is from said server.

3. The electronic mail terminal as claimed in claim 1, further comprising means for providing notice of receipt of electronic mail when the electronic mail is received.

4. The electronic mail terminal as claimed in claim 1, further comprising means for displaying the electronic mail information, the displayed electronic mail information including the number of electronic mail messages that have been received.

5. The electronic mail terminal as claimed in claim 1, further comprising means for displaying the electronic mail information, the displayed electronic mail information including information identifying the sender of a received electronic mail message.

6. The electronic mail terminal as claimed in claim 1, further comprising means for displaying the electronic mail information, the displayed electronic mail information including a title of a received electronic mail message.

7. A system for delivering electronic mail comprising:
   a network connecting server for receiving electronic mail information and initiating a call to a telephone number of a recipient of the received electronic mail information; and
   an electronic mail terminal having an interface unit to be connected to a telephone line, detecting means for detecting a caller telephone line, detecting means for detecting a caller telephone number obtained by said interface unit, comparing means for comparing said caller telephone number detected by said detecting means with a telephone number of said network connecting server so as to determine whether or not said telephone numbers coincide with each other, calling means for initiating a call to said network connecting server so as to connect said electronic mail terminal to said network connecting server through said interface unit, a memory for storing information about received electronic mail, and a control unit, when said comparing means determines that an incoming call is from said network connecting server, for controlling said calling means to automatically call back said network connecting server so as to connect said electronic mail terminal to said network connecting server and download the electronic mail information stored in said network connecting server, and for controlling said memory to store the electronic mail information.

8. The system of claim 7, wherein said interface unit includes a line to be connected to a telephone and operates to disconnect said line when said comparing means determines that the incoming call is from said server.

9. A communication terminal for connection to a telephone line, comprising:
   a telephone;
   means for detecting a caller telephone number of an incoming call;
   means for comparing the caller telephone number with a predetermined telephone number of a server;
   a memory; and
   means for permitting communication via the telephone if the caller telephone number does not match the predetermined telephone number of the server, and if the caller telephone number does match the predetermined telephone number of the server, for keeping the telephone from ringing, calling the server back, automatically downloading information from the server, and storing the downloaded information in the memory.

10. The communication terminal of claim 9, wherein the downloaded information is electronic mail, and further comprising means for displaying comprising means for displaying the electronic mail.

11. The communication terminal of claim 10, wherein the telephone comprises a handset and a base unit having a keypad, and wherein the means for displaying comprises a display device that is mounted on the base unit.

12. The communication terminal of claim 10, wherein the communication terminal is an integrated unit, with the means for displaying being mounted on the telephone.

* * * * *